Feb. 24, 1953

T. C. RUSCONI 2,629,306

HYDRAULIC CONTROL SYSTEM

Filed July 15, 1949

INVENTOR.
THEODORE C. RUSCONI
BY Huebner, Beehler,
Worrel, Herzig & Caldwell
ATTORNEYS

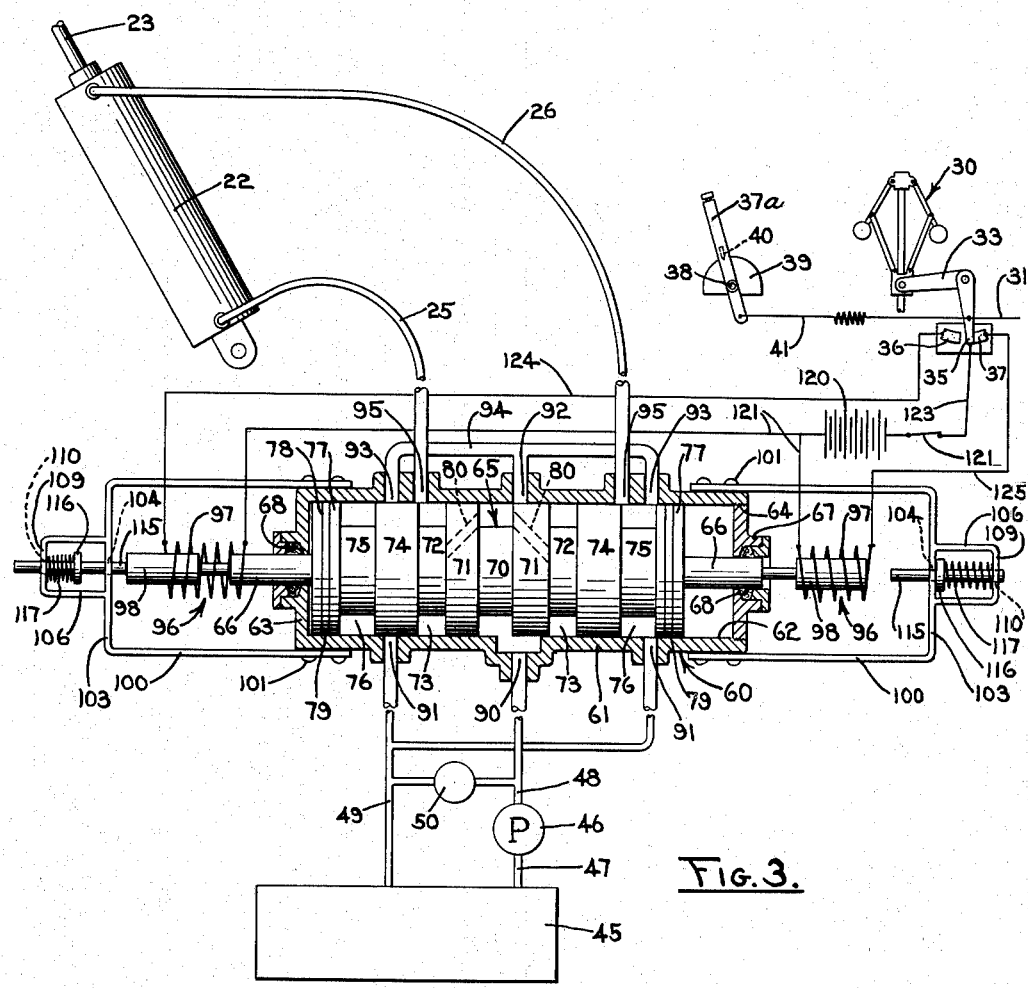

Patented Feb. 24, 1953

2,629,306

UNITED STATES PATENT OFFICE 2,629,306

HYDRAULIC CONTROL SYSTEM

Theodore C. Rusconi, Sanger, Calif.

Application July 15, 1949, Serial No. 104,874

7 Claims. (Cl. 97—50)

The present invention relates to control systems for agricultural implements and more particularly to a hydraulic control system operable in connection with a draft appliance having an elevationally positionable tool bar to effect automatic elevational positioning of the tool bar in response to resistance offered to forward movement of the draft appliance.

Tractors providing elevationally positionable tool bars for mounting earth working tools have become well known and popular, particularly for relatively light cultivation requirements as experienced in the tilling of truck gardens, vineyards, orchards, and elsewhere where the earth working tool desired to be employed is suitable for direct tractor mounting. Although the mounting of plows, cultivators, discs, and the like directly on the tool bars of such tractors has proved of great aid, it has been subject to certain difficulties which the present invention seeks to overcome.

Such tool bars are usually elevationally positioned by a hydraulic ram. The operational height of the tool bar is predetermined by preliminary adjustments prior to operation. Varied soil character, varied moisture content, and uneven terrain causes earth working tools borne by such tool bars to engage the earth to various depths and to impose widely varied resistances to forward movement of the tractor. Frequently tools borne by such tool bars rearwardly of tractors tend to depress the rearward end of the tractor upon increased load and such depressing further to increase the load by greater depth of soil engagement, necessitating frequent interruption of the cultivating operation to readjust the tool bar position.

In an unsuccessful effort to solve these problems, many such tractors have been provided with governors which automatically increase the fuel supply to the engines thereof in response to decrease in motor speed incident to the excessive drag imposed by an earth working tool. This arrangement has been found to impose undue strains on the tractor, on the earth working tool, and to result in such widely varied earth working results as to be objectionable. Still further, the mere increase of fuel supply to the engine of the tractor coming after the imposition of an excessive load thereon does not necessarily enable the engine to increase its speed and thus its power in response to increased fuel and a substantial fuel loss is experienced.

An object of the present invention is, therefore, to provide in a draft appliance an improved control system for an elevationally positionable tool bar.

Another object is to translate the drag of an earthworking tool mounted on an elevationally positionable tool bar of a draft appliance into elevational positioning of the tool bar to achieve substantially constant resistance to forward motion of the draft appliance.

Another object is to provide in a tractor having an elevationally positionable tool bar and an earthworking tool borne by the tool bar for earth engagement, an improved automatic control system for the elevational positioning of the tool bar and its earthworking tool so as to insure substantially constant earth traversing speed by the tractor in response to a given throttle setting.

Another object is to provide improved elements and arrangements thereof in a device of the character and for the purposes set forth.

Further objects will become apparent in the subsequent description in the specification.

In the drawings:

Fig. 3 is a view of the elements shown in Fig. 2 demonstrating the positioning of the valve to modify the elevational positioning of the tool bar.

Figure 1:
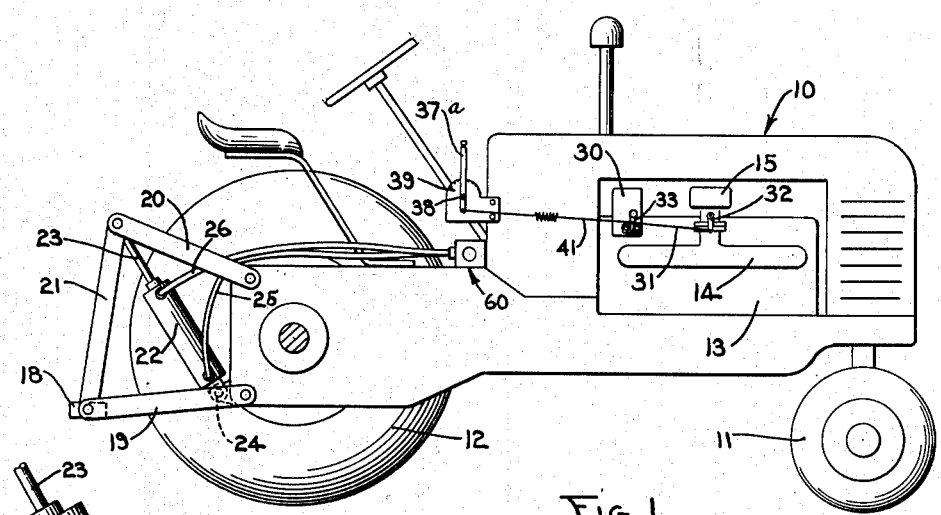
Fig. 1 is a side elevational view of a tractor having a rear wheel removed for convenience in illustrating a hydraulically controlled elevationally positionable tool bar mounted on the tractor and controlled by the apparatus of the present invention.

Referring in greater detail to the drawings:

In Fig. 1 is illustrated a tractor 10 which exemplifies draft appliances with which the control apparatus of the present invention is adapted to be used. The tractor is supported for ground traversing movement on steerable front wheels 11 and power driven rear wheels 12. The rear wheels are driven by an engine 13 provided with controlled amounts of operating fuel through an intake manifold 14 and connected carburetor 15, in the conventional manner.

A tool bar 18 is supported and elevationally positionable in any convenient manner on a pair of links 19 pivoted to the tractor and the drawbar. The drawbar is adapted to support one or more soil tilling implements, such as a plow, disc harrow or the like. A second pair of links 20 are pivoted for vertical movement on the tractor having outer ends pivotally connected to connecting bars 21 which in turn are pivotally attached, at their lower ends, to the outer ends of the links 19. On vertical pivotal movement of the links 19 and 20, the tool bar 18 and implements (not shown) mounted thereon are elevationally positioned in response thereto. The tractor and tool bar mounting, as thus far described, is of generally well known construction.

To elevate and to depress the tool bar 18, a hydraulic ram 22 having a piston rod 23 extended therefrom is pivotally connected to the outer free ends of the links 20. The ram has a conduit 25 connected to its lower end adapted to service the ram with hydraulic fluid under pressure to extend the same. Another conduit 26 is connected in fluid communication with the upper end of the hydraulic ram and is adapted to contract the ram to lower the drawbar when hydraulic pressure is applied to the ram therethrough. As is the conventional practice, when pressure is supplied to one of the conduits fluid is bled from the opposite end of the ram through the other conduit.

The tool bar mounting structure, the type of ram shown, and the arrangement of the mounting and the ram are essentially conventional and illustrated to facilitate description of the system of the present invention. It is to be understood that the present invention is not limited to use with the specific ram and tool bar structure and association described but may suitably be employed with any elevationally positionable tool bar which is elevated and depressed by hydraulic means. Further, it is possible to employ the ram on agricultural implements having adjustable depth of soil engagement or other means for regulating resistance to earth traversing movement so that the system of the present invention accomplishes the automatic regulation of draft resistance imposed upon the tractor. Such an association is believed to be within the scope and spirit of the present invention.

Figure 2:
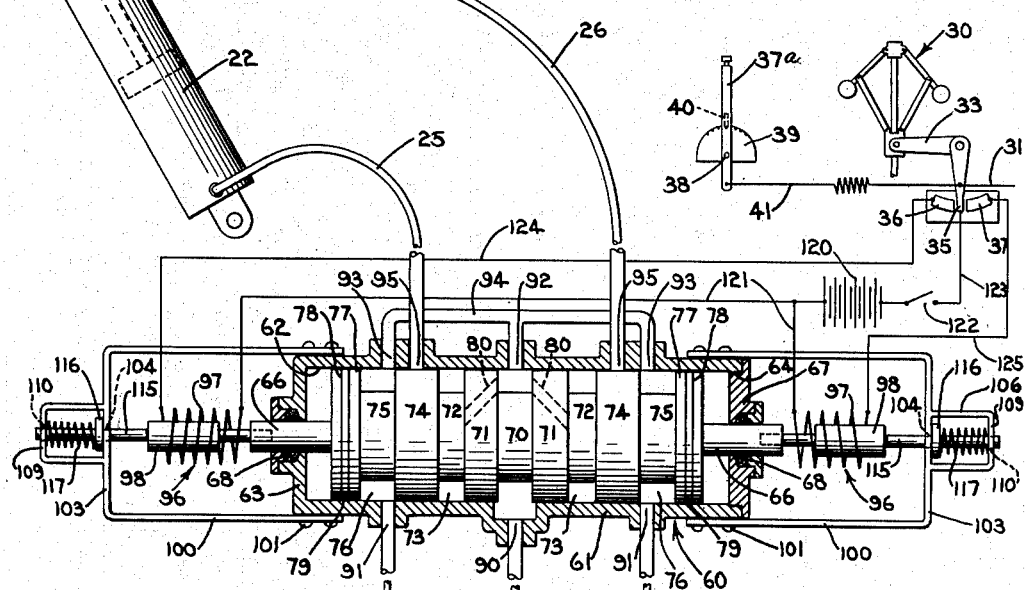
Fig. 2 is a diagrammatic representation of the hydraulic control apparatus of the present invention including in longitudinal section a valve structure employed therein as positioned to lock the elevationally positionable tool bar in adjusted position.

The carburetor 15 is provided with a conventional throttle control, not shown, and the flow of fuel to the carburetor regulated by said throttle, as modified by a governor shown generally at 30. The governor may be of the fly-ball type, as shown in Figs. 2 and 3 or of any other suitable form. Such governors are frequently conventional equipment on tractors and are connected by a governor-throttle control rod 31 connected to a fuel regulating butterfly, such as at 32. It is sufficient for purposes of the present invention to observe that the governor 30 provides an arm 33 which is pivotally positioned in response to engine speed variations at any given throttle setting and to which the governor-throttle control rod 31 is connected.

As shown in Figs. 2 and 3, an electrical contact 35 is mounted on the arm 33 for unitary reciprocal positioning therewith. A pair of spaced electrical contacts 36 and 37 are mounted for engagement by the contact 35 upon pivotal movement from its normally central position. The contacts 36 and 37 are preferably arcuate in form and arranged so that the contact 35 can pass thereacross without inhibiting governor operation while establishing electrical contact with either thereof. If desired, the contacts 36 and 37 may be mounted for adjustable spacing relative to the normal operating position for the contact 35 so as to adjust the acuity of operation of the system of the present invention. It will be observed in Figs. 2 and 3 that increased speed of the engine 13 will cause the governor balls to fly outwardly thus pivoting the arm 33 to the left to electrical engagement with the contact 36. Similarly, the slower the speed of the engine the farther the arm 33 pivots to the right for electrical engagement with the contact 37. Extreme pivoting of the arm 33 either to the right or to the left will continue the electrical engagement between the contact 35 and the appropriate contact 36 or 37.

As will subsequently become apparent, means are provided for biasing the operation of the governor consisting of a control arm 37a pivotally mounted in the tractor, as at 38, in a position conveniently accessible by a tractor operator and provided with a concentric toothed plate 39 in association with which a detent 40 mounted on the arm 37a latches the arm in operator adjusted position. The arm 37a is downwardly extended from its pivotal mounting and said downwardly extended end is connected to the arm 33 by means of a resilient linkage 41 whereby the operation of the governor may be resiliently urged through the linkage 41 in response to setting of the arm 37a to aid or to resist outward throw of the balls and the resulting effects on the fuel supply to the engine 13 of the tractor.

A reservoir 45 for hydraulic fluid is provided on the tractor and a fluid pump 46 associated therewith whereby fluid under pressure is delivered to the system of the present invention. An intake line 47 interconnects the pump and the reservoir. The pump has a high pressure discharge line 48 extending therefrom. A return conduit 49 interconnects the system of the present invention and the reservoir for return flow of fluid to the reservoir from the system. A by-pass safety valve 50 interconnects the high pressure conduit 48 and the return conduit 49 so that any excessive pressures built up by the pump are dissipated through the valve 50 back to the reservoir 45.

As shown in Figs. 2 and 3, a master control valve, indicated generally at 60, is interposed the conduits 25 and 26 and the conduits 48 and 49. The valve consists of a housing 61 having a cylindrical inner bore 62, a closed end portion 63, and a threaded opposite end portion 64. A core 65 is slidably fitted to the bore 62 in substantial fluid tight engagement therewith. For controlled positioning of the core 65, control rods 66 are axially and concentrically extended from the core to positions exteriorly of the housing. One of the control rods 66 is slidably extended through the closed end portion 63 and the opposite control rod 66 slidably mounted in a bushing 67 which is screw-threadably engaged in the opening 64 in closing relation to the housing. It will be apparent that axial movement of either of the control rods 66 from externally of the housing 61 results in responsive positioning of the core 65 within the housing. Packing glands 68 serve to preclude leaking of fluid about the control rods. If desired, the closed end portions 63 and 67 may be ported so that opposite end portions of the core 65 are subjected to atmospheric pressure.

The core 65 consists of a plurality of adjacent, axially aligned, concentric portions, alternate ones of which are slidably fitted to the housing 61 with intermediate portions formed of reduced diameter to define circumscribing fluid passages. A central portion of reduced diameter is provided in the core to accommodate a circumscribing high pressure passage 70 about the core within the housing. The high pressure passage 70 is axially defined by a pair of spaced primary gates 71 slidably fitted to the housing. Endwardly adjacent the gates 71 are portions of reduced diameter 72 providing circumscribing control passages 73 axially limited at their outer ends by enlarged cylindrical portions 74, referred to as secondary gates, slidably fitted to the housing. Portions of reduced diameter 75 axially adjacent to the secondary gates 74 provide circumscribing fluid return passages 76 thereabout axially limited by annular fluid retaining flanges 77 slidably fitted to the housing. The flanges 77 each have a circumscribing groove 78 which receives a packing 79 to preclude leaking of hydraulic fluid within the housing axially beyond the portions 77. The control passages 73 are connected in fluid communication with the high pressure passage 70 by bores 80 formed through the primary gates 71.

A supply port 90 is provided centrally of the housing 61 for registration with the high pressure passage 70 in the core 65. The supply port 90 is of a size sufficient continually to register with the high pressure passage 70 during all longitudinal movement of the core. The port 90 is connected to the pressure supply conduit 48. A pair of fluid return ports 91 are provided in the housing in longitudinally spaced relation to the ports 90 and arranged to register with the return passages 76 when the core is in central position. The return ports 91 are both connected to the return conduit 49. An exhaust port 92 is provided in alignment transversely of the housing 61 with the pressure supply port 90. A pair of return ports 93 are provided in the housing in transverse alignment with the ports 91. A by-pass conduit 94 interconnects the ports 92 and both of the ports 93. Intermediate the exhaust ports 92 and each of the return ports 93, control ports 95 are provided in the housing 61 in positions blocked by the secondary gates 74 when the core is in central position, as shown in Fig. 2. One of the control ports 95 is connected to the conduit 25 and the other control port 95 connected to the conduit 26.

To control the positioning of the valve core 65 in housing 61, solenoids indicated generally at 96, having windings 97 and cores 98, are connected to the valve core as by screw-threaded engagement by the solenoid cores with the control rods 66. The solenoids are arranged to have opposing effects on the core so that, as subsequently described, energizing of one of the coils urges the core axially in one direction in the housing and energizing of the opposite coil urges the core in the opposite direction. A mounting frame 100 is extended axially from the housing in caging relation to the solenoids and mounted on the housing, as at 101. The frames provide end portions 103 traversing alignment with the core 65, control rod 66 and solenoids 96 and have bores 104 formed therein in axial alignment with said elements. A secondary frame 106 is mounted on the frame 100 and endwardly extended therefrom, providing in spaced relation to the end portions 103, secondary end portions 109 in which provision is made of bores 110 in axial alignment with the bores 104.

Stop members 115 are mounted in the bores 104 and 110 for axial slidable movement therein. Each of the stop members 115 provides a circumscribing flange, or collet, 116 fixedly mounted thereon in a position when in abutting relation with the end portions 103 defining an inward limit to the slidable movement of the stop members. This inward limit to the movement of the stop members is arranged so that said stop members abut the adjacent solenoid cores 98 when the valve core 65 is centrally positioned, as shown in Fig. 2, and springs 117 are provided under initial compression between the collets 116 and the secondary end portions 109 so that said stop members resiliently resist movement of their respective solenoid coils theretoward. It is significant that the stop members are not connected to the solenoids and that they only resist movement of their respective solenoid cores toward the end portions 103 from central position.

A battery 120 mounted on the tractor 10 conveniently provides a source of electrical energy for selectively energizing the coils 97 of the solenoids 96. One end of each of the coils 97 is connected by a lead wire 121 to one pole of the battery. The opposite pole of the battery is connected through a manually operated switch 122 by means of an electrical conductor 123 to the movable contact 35. The opposite end of one of the coils 97 is connected by an electrical conductor 124 to the fixed contact 36 and the opposite end of the other coil 97 connected by an electrical conductor 125 to the contact 37. The manually operable switch 122 provides means for interrupting the electrical circuits just described so that the core 65 remains in its centered position under the urging of the springs 117. As previously suggested, the solenoid coils 97 are arranged to have opposite positioning effects on the core 65 for displacement thereof from the central position when the switch 122 is closed and upon engagement by the contact 35 with either of the contacts 36 or 37.

Operation

The operation and utility of the present invention is believed apparent from the foregoing description and is briefly summarized at this point.

When the tractor 10 is not in operation, the manual switch 122 is opened so that there is no drain on the battery 120 and no forces imposed upon the core 65 incident to energizing of the solenoid coils 97. In the absence of any electrical effects on the solenoids, the stop members 115 under the urging of the springs 117 urge the core 65 into central position, demonstrated in Fig. 2.

When the engine 13 of the tractor 10 is started, the hydraulic pump 46, which has any suitable motivating connection to the engine 13, is energized and hydraulic fluid under pressure is drawn from the reservoir 45 through the conduit 47 and imparted to the high pressure passage 70 in the master control valve 60 through the conduit 48. With the core 65 centrally positioned, the hydraulic fluid is pumped through the high pressure passage 70 out the exhaust port 92, through the by-pass conduit 94, back into the housing 61, through the return ports 93, through the return passages 76, outwardly through the return ports 91 and by way of the conduit 49 back to the reservoir. In such condition, the secondary gates 74 overlay the control ports 95 and the ram 22 is locked in its initial position, whatever that may be, by the blocking of the conduits 25 and 26. Thus, the tractor may be employed with the tool bar 18 locked in any given predetermined elevation by the opening of the switch 122. This permits the convenient transporting of any earth working tool, not shown, mounted on the tool bar 18 or working of the earth by such tool with the tool bar locked in a lowered position without employing the automatic elevating of the tool bar and earth working tool incident to the operation of the device and system of the present invention.

The arrangement of the governor 30, the governor control arm 33, and the switch contacts 35, 36 and 37 is such that at normal operating speeds the fly-balls of the governor will position the movable contact 35 intermediate the fixed contacts 36 and 37. As previously described, the control arm 37a may be positioned resiliently to affect the governor operation and positioning of the contact 35 as desired. When the switch 122 is closed with the contact 35 disengaged from both of the contacts 36 and 37, there is no electrical effect on either of the solenoids and the core 65 remains in its centrally located position under the urging of the springs 117. Also, as previously suggested, the contacts 36 and 37 may be mounted for relative special adjustment relative to the central position of the movable contact 35 to modify the acuity of operation of the system of the present invention, or may be mounted for unitary shifting movement of the contacts 36 and 37 relative to contact 35, if desired. The adjustable mounting of the contacts 36 and 37 may provide a useful adjunct to the present invention but is not considered essential to its successful operation and thus these details relating to adjustable mounting are not described in greater detail nor claimed in the instant application.

If it is assumed that the ram 22 is locked in the contracted condition with the tool bar 18 lowered and an earth working tool borne thereby positioned in soil engagement, it will be apparent that resistance offered by the tool to forward movement of the tractor 10 will vary in response to types of soil encountered, moisture content of the soil, and objects such as roots and the like engaged by the earth working tool. It is these variations in resistance to forward movement of the tractor that has caused the considerable difficulty already described. With the switch 122 closed, such variations result in modification of the elevation of the tool bar and thus in automatic elevation of the earth working tool so that substantially constant resistance to forward movement of the tractor is achieved.

As shown in Fig. 3, if a substantially increased resistance to the forward movement of the tractor is encountered, the engine speed of the tractor will be somewhat reduced and the fly-balls of the governor 30, due to decreased centrifugal force thereon, will lower. This pivots the governor control arm 33 in a counter-clockwise direction, as viewed, and brings the movable contact 35 into engagement with the contact 37, energizing the coil 97 of the solenoid shown at the right of the drawings. The energizing of this solenoid draws the core 98 into the coil 97 and urges the core 65 of the master control valve 60 to the left and compresses the spring 117 at the left. In this position, the primary gate 71 at the right of the high pressure passage 70 overlays the exhaust port 92 and precludes fluid movement therethrough. Fluid under pressure, admitted to the high pressure passage 70 through the supply port 90, blows to the left through the bore 80 into the control passage 73 and thence outwardly through the adjacent control port 95, into the conduit 25. The imposition of hydraulic fluid under pressure on the ram through the conduit 25 serves to extend the ram, necessitating a bleeding of fluid therefrom through the conduit 26. Fluid returning through the conduit 26 passes through the right hand control port 95, as viewed in the drawings, into the right hand return passage 76 and thence through the right hand return port 91 back through the conduit 49 to the reservoir. The extension of the ram, as evident in Fig. 1, serves to elevate the tool bar 18, which in turn reduces the depth of earth engagement of any earth working tool borne by the tool bar, resulting in a reduction in resistance offered to forward movement of the tractor. This reduction in resistance to forward movement permits the engine 13 of the tractor to increase its speed, without throttle movement, the fly-balls of the governor 30 move outwardly, and the movable contact 35 is withdrawn from engagement with the contact 37. Upon interruption of the electrical circuit of either of the solenoids, the springs 117 return the valve core 65 to central position, again locking the ram in adjusted position and permitting the by-pass of hydraulic fluid under pressure through the valve back to the reservoir.

It will further be apparent that any substantial decrease in resistance to forward movement of the tractor 10, while the switch 122 is closed, will result in outward movement of the fly-balls of the governor 30, movement of the governor control arm 33 to the left, as viewed, and engagement of the movable contact 35 with the contact 36 resulting in the energizing of the solenoid coil 97 at the left of the drawings. This will axially move the valve core 65 to the right, as viewed, resulting in an imposition by hydraulic fluid under pressure on the ram through the conduit 26 and bleeding of the opposite end of the ram back through the conduit 25 and the master control valve to the reservoir. Hydraulic fluid under pressure passing to the ram through the conduit 26 contracts the ram and forcibly lowers the tool bar 18, increasing the depth of earth engagement by any earth working tool borne thereby. The lowering of such an earth working tool automatically increases the resistance to forward movement of the tractor, resulting in a decrease in speed of the engine 13 without throttle manipulation. The decrease in engine speed results in the displacement of the contact 35 from the contact 36 and the interruption of the electrical circuit to their respective solenoid coils 97, and the valve core 65 is urged into central position by the springs 117, again locking the ram in adjusted position.

Thus, it is possible at a given throttle setting to perform an earth working operation by use of the tractor without any substantial variation in the speed of the earth traversing movement of the tractor or the power available at the tool bar. In actual operation, the system of the present invention has proved effective in automatically adjusting elevation of the tool bar to resistance offered to forward movement of the tractor. In operation, it is normal to set the throttle of the tractor to achieve the desired earth traversing speed and through adjusted setting of the control arm 37a to bias the governor 30 through the resilient linkage 41 so that a substantially constant predetermined resistance to earth traversing movement is set and so that any substantial departures from said predetermined resistance results in the closing of an electrical circuit to either of the solenoids, modifying the elevation of the tool bar 18 in response thereto.

The ram 22 may be mounted on any desired earth working tool so that contraction and extension of the ram affect the resistance of the earth working tool to forward movement without departing from the spirit or the scope of the present invention.

The essence of the present invention is believed to reside in the provision of a system for translating engine speed variations incident to loads imposed upon the tractor into responsive ram contraction or extension to affect modification of the load imposed on the tractor.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and structures.

Having described my invention, what I claim as new and desired to secure by Letters Patent is:

1. In combination, a tractor having an engine for motivating the tractor in earth traversing movement, a source of electrical energy, a throttle controlling fuel supply to the engine, and a source of hydraulic fluid under pressure; a tool bar mounted on the tractor for elevational movement; a two-way ram interconnecting the tractor and the tool bar and elevationally positioning the tool bar by telescopic adjustment of the ram; a governor mounted on the tractor and connected to the engine; a hydraulic system interconnecting the source of fluid under pressure and opposite end portions of the ram; said system including valve means adapted to direct hydraulic fluid under pressure from the source thereof to either end of the ram while simultaneously opening the other end of the ram to bleed hydraulic fluid therefrom; electro-magnetic means having controlling connection to the valve means; an electrical circuit interconnecting the source of electrical energy and the electro-magnetic means; and a switch in the circuit connected to the governor having an open condition in which it is positioned by the governor when the engine is operated at a predetermined speed, a tool bar lowering condition providing an electrical path therethrough to the electro-magnetic means regulating the valve means to extend the ram in which it is positioned by the governor when the engine speed increases beyond said predetermined speed, and a tool bar raising condition providing a second electrical path therethrough to the electro-magnetic means regulating the valve means to contract the ram in which it is positioned by the governor when the engine speed decreases below the predetermined speed.

2. The combination of a tractor having an elevationally positionable tool bar mounted thereon, a source of hydraulic fluid under pressure, an engine for motivating the tractor in earth-traversing movement, and a governor responsive to engine speed variations; a ram connected to the tool bar and to the tractor in elevation controlling relation to the tool bar; a hydraulic system interconnecting the source of hydraulic fluid under pressure and each end of the ram, said system including a master control valve having a neutral position in which fluid flow to and from both ends of the ram is blocked, a ram extending position in which fluid is fed under pressure to one end of the ram while bleeding the opposite end of the ram, and a ram contracting position in which fluid is fed under pressure to said opposite end of the ram while said first mentioned end of the ram is bled; resilient means urging the valve into neutral position; electromagnetic means having controlling connection to the valve; an electrical circuit including a source of electrical energy interconnecting the source of electrical energy and the electro-magnetic means; and a switch in the circuit having a movable contact electrically connected to the source of electrical energy and having position controlling connection to the governor and a pair of spaced contacts engageable by the movable contact, one thereof being electrically connected to the electro-magnetic means whereby energizing of the electro-magnetic means therethrough positions the control valve to extend the ram and the other thereof being electrically connected to the electro-magnetic means whereby energizing of the electro-magnetic means therethrough positions the control valve to contract the ram.

3. In a tractor having an engine and a tool bar mounted for adjustable elevational movement, a governor responsive hydraulic control system comprising a source of fluid under pressure, a two-way ram connected between the tractor and the tool bar, conduit means interconnecting the source of fluid under pressure and each end of the ram, a master control valve positioned in the conduit means and having a reciprocable core adapted when centrally located to close the conduit means between the ram and the reservoir, to direct fluid under pressure to one end of the ram through the conduit means while bleeding the opposite end of the ram through the valve when displaced in one direction from central position and to impart fluid under pressure to said opposite end of the ram while the first mentioned end of the ram is bled through the valve when oppositely displaced from central position, electro-magnetic means connected in controlling relation to the core of the valve, an electrical circuit for the electro-magnetic means including a pair of fixed contacts and a movable contact, said circuit being arranged with the electro-magnetic means so that the core is drawn to one position displaced from central position by engagement of the movable contact with one of the fixed contacts and to the opposite displaced position by engagement of the movable contact with the opposite fixed contact, and speed responsive governor means connected to the tractor engine mounted in position-controlling relation to the movable contact whereby variation in governor speed is translated into movement of the movable contact to and from individual engagement with the fixed contacts.

4. A tool bar control system for tractors having a tool bar mounted for elevational movement thereon, a source of motivating power, a throttle for controlling fuel supply to the source of motivating power, and a source of electrical energy, comprising a governor having driven connection to the source of motivating power; a contractible and extensible ram interconnecting the tool bar and the tractor for adjustable elevational movement of the tool bar relative to the tractor; a source of hydraulic fluid under pressure; a conduit interconnecting the source of fluid under pressure and opposite ends of the ram; a master control valve positioned in the conduit having a neutral position in which fluid flow to and from the ram is blocked, an elevating position in which fluid flow is directed to one end of the ram to contract the ram while bleeding fluid from the opposite end of the ram, and a depressing position in which fluid flow is directed to said opposite end of the ram causing the ram to expand while bleeding fluid from the end of the ram to which fluid is directed for contracting purposes; electrical means having controlling connection to the valve; and an electrical switch connected to the governor and electrically connected between the source of electrical energy on the tractor and the electrical means, said switch having a neutral position in which electrical communication between the source of electrical energy and the electrical means is interrupted, an elevating position in which a path of electrical current through the switch to the electrical means is provided energizes the electrical means to position the valve to contract the ram, and a depressing position in which an electrical path is established through the switch to the electrical means energizing said electrical means to position the valve to expand the ram.

5. In combination, a tractor having an engine for motivating the tractor in earth traversing movement, a source of electrical energy, a throttle controlling fuel supply to the engine, and a source of hydraulic fluid under pressure; a tool bar mounted on the tractor for elevational movement; a two-way ram interconnecting the tractor and the tool bar and elevationally positioning the tool bar by telescopic adjustment of the ram; a governor mounted on the tractor and connected to the engine; a hydraulic system interconnecting the source of fluid under pressure and opposite end portions of the ram; said system including valve means adapted to direct hydraulic fluid under pressure from the source thereof to either end of the ram while simultaneously opening the other end of the ram to bleed hydraulic fluid therefrom; electro-magnetic means having controlling connection to the valve means; an electrical circuit interconnecting the source of electrical energy and the electro-magnetic means; a switch in the circuit connected to the governor having an open condition in which it is positioned by the governor when the engine is operated at a predetermined speed, a tool bar lowering condition providing an electrical path therethrough to the electro-magnetic means regulating the valve means to extend the ram in which it is positioned by the governor when the engine speed increases beyond said predetermined speed, and a tool bar raising condition providing a second electrical path therethrough to the electro-magnetic means regulating the valve means to contract the ram in which it is positioned by the governor when the engine speed decreases below the predetermined speed; an adjustably positioned control lever; and resilient means interconnecting the control lever and the governor whereby operation of the governor in response to increase in engine speed is adjustably resisted.

6. The combination of a tractor having an elevationally positionable tool bar mounted thereon, a source of hydraulic fluid under pressure, an engine for motivating the tractor in earth-traversing movement, and a governor responsive to engine speed variations; a ram connected to the tool bar and to the tractor in elevation controlling relation to the tool bar; a hydraulic system interconnecting the source of hydraulic fluid under pressure and each end of the ram, said system including a master control valve having a neutral position in which fluid flow to and from both ends of the ram is blocked, a ram extending position in which fluid is fed under pressure to one end of the ram while bleeding the opposite end of the ram, and a ram contracting position in which fluid is fed under pressure to said opposite end of the ram while said first mentioned end of the ram is bled; resilient means urging the valve into neutral position; electro-magnetic means having controlling connection to the valve; an electrical circuit including a source of electrical energy interconnecting the source of electrical energy and the electro-magnetic means; a switch in the circuit having a movable contact electrically connected to the source of electrical energy and having position controlling connection to the governor and a pair of spaced contacts engageable by the movable contact, one thereof being electrically connected to the electro-magnetic means whereby energizing of the electro-magnetic means therethrough positions the control valve to extend the ram and the other thereof being electrically connected to the electro-magnetic means whereby energizing of the electro-magnetic means therethrough positions the control valve to contract the ram; an adjustably positioned control lever; and resilient means interconnecting the control lever and the movable contact of the switch.

7. In a tractor having an engine provided with a carburetor and having a tool bar mounted for adjustable elevational movement, a governor responsive hydraulic control system comprising a source of fluid under pressure, a two-way ram connected between the tractor and the tool bar, conduit means interconnecting the source of fluid under pressure and each end of the ram, a master control valve positioned in the conduit means and having a reciprocable core adapted when centrally located to close the conduit means between the ram and the reservoir, to direct fluid under pressure to one end of the ram through the conduit means while bleeding the opposite end of the ram through the valve when displaced in one direction from central position and to impart fluid under pressure to said opposite end of the ram while the first mentioned end of the ram is bled through the valve when oppositely displaced from central position, resilient means urging the core of the valve into central position, electrical solenoids connected to opposite ends of the core in opposition to each other, an electrical circuit including a source of electrical energy including a pair of fixed contacts and a movable contact, the fixed contacts being individually connected to the solenoids and the movable contact being connected to the source of electrical energy, a governor connected to the engine of the tractor responsive to engine speed variation, control means interconnecting the governor and the movable contact positioning the movable contact relative to the fixed contacts in response to engine speed variation, a control rod interconnecting the control means and the carburetor of the engine, an adjustably positionable control lever, and resilient means interconnecting the control lever and the control means whereby action of the governor on the movable contact and on the carburetor is adjustably controlled.

THEODORE C. RUSCONI.

REFERENCES CITED

The following references are of record in the file of this patent:

UNITED STATES PATENTS

| Number | Name | Date |
|---|---|---|
| 2,118,181 | Ferguson | May 24, 1938 |
| 2,237,114 | Read | Apr. 1, 1941 |
| 2,342,763 | Smith | Feb. 29, 1944 |
| 2,376,576 | Cross | May 22, 1945 |
| 2,484,069 | Boncompain | Oct. 11, 1949 |